(12) United States Patent
Takayanagi et al.

(10) Patent No.: US 7,328,922 B2
(45) Date of Patent: Feb. 12, 2008

(54) QUICK CONNECTOR

(75) Inventors: Akira Takayanagi, Aichi (JP); Atsuo Miyajima, Aichi (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 113 days.

(21) Appl. No.: 11/068,093

(22) Filed: Feb. 28, 2005

(65) Prior Publication Data

US 2005/0230968 A1 Oct. 20, 2005

(30) Foreign Application Priority Data

Mar. 30, 2004 (JP) ............... 2004-099619

(51) Int. Cl.
*F16L 37/00* (2006.01)
(52) U.S. Cl. ............... 285/308; 285/320; 285/93
(58) Field of Classification Search ............... 285/308, 285/319, 320, 93
See application file for complete search history.

(56) References Cited

U.S. PATENT DOCUMENTS

| | | | | |
|---|---|---|---|---|
| 5,568,946 A | * | 10/1996 | Jackowski | 285/38 |
| 5,873,610 A | * | 2/1999 | Szabo | 285/319 |
| 5,897,142 A | * | 4/1999 | Kulevsky | 285/308 |
| 5,947,531 A | * | 9/1999 | Eckard et al. | 285/319 |
| 6,129,393 A | | 10/2000 | Kodama et al. | |
| 6,517,120 B1 | * | 2/2003 | Miyajima et al. | 285/305 |
| 6,523,864 B1 | * | 2/2003 | Discher et al. | 285/319 |
| 6,637,780 B2 | | 10/2003 | Miyajima et al. | |
| 6,688,654 B2 | * | 2/2004 | Romero | 285/308 |
| 6,722,703 B2 | * | 4/2004 | Takayanagi | 285/93 |
| 6,837,525 B2 | * | 1/2005 | Miyajima | 285/319 |
| 6,916,050 B2 | * | 7/2005 | Milhas | 285/320 |

FOREIGN PATENT DOCUMENTS

| | | |
|---|---|---|
| EP | 1134475 | 9/2001 |
| GB | 2349437 | 11/2000 |
| JP | 06-174166 A | 6/1994 |
| JP | 08-200577 A | 8/1996 |
| JP | 08-200578 A | 8/1996 |
| JP | 10-503831 A | 4/1998 |
| JP | 2002-013684 A | 1/2002 |
| JP | 2002-054780 A | 2/2002 |
| JP | 2002-098283 A | 4/2002 |
| JP | 2002-327882 A | 11/2002 |
| WO | 96/18842 A1 | 6/1996 |
| WO | WO-96/18842 | 6/1996 |
| WO | WO-98/27374 | 6/1998 |
| WO | WO-98/27375 | 6/1998 |

* cited by examiner

*Primary Examiner*—David Bochna
(74) *Attorney, Agent, or Firm*—Darby & Darby P.C.

(57) ABSTRACT

A quick connector includes: a cylindrical connector housing having a tube connecting portion and a pipe retainer portion that has a retainer; and an annular seal member fitted on an inner circumferential surface of the connector housing. The retainer is integrally formed with the pipe retainer portion and having an engagement portion projecting toward the interior of the pipe retainer portion, and a disengagement operating portion adapted to move the engagement portion radially outwardly. The connector housing is formed by engaging with each other end side in an axial direction of a tube side member having the tube connecting portion, and one end side in the axial direction of a pipe side member having the pipe retainer portion. The annular seal member is axially positioned in an annular recess formed in the connector housing when the tube side member and the pipe side member are engaged with each other.

5 Claims, 10 Drawing Sheets

QUICK CONNECTOR

BACKGROUND OF THE INVENTION

1. Field of the Invention

This invention relates to a quick connector used to join together pipes in a gasoline fuel system for an automobile, for example.

2. Description of the Related Art

As a connector applied to the connection of a pipe and a resin tube, which is an opposed member of the pipe, in the piping for a gasoline fuel system for an automobile, a quick connector formed so as to be snap engaged with the pipe is used. Such a quick connector can connect the resin tube to the pipe when the quick connector is snap engaged with the pipe and joined thereto by one pressing action while a tube connecting portion at one end side in an axial direction of the quick connector is fit into the resin tube and an insert end portion of the pipe is inserted into an opening at the other end in the axial direction of the quick connector.

For example, as disclosed in U.S. Pat. No. 6,129,393, snap engagement structures for a quick connector and a pipe include a structure in which a pipe retainer portion is provided on the other end side in an axial direction of a connector housing having a tube connecting portion at one end in the axial direction thereof, and a retainer, which is formed so as to be snap engaged with an insert end portion of a pipe, is fit into the pipe retainer portion. In this snap engagement structure, a cross-sectionally C-shaped retainer body having at the other end in the axial direction thereof a pair of operating arms integrally formed thereon is used as the retainer. Such a retainer is fitted into the pipe retainer portion so that a pair of engagement claws provided on the other end side in the axial direction thereof enter engagement windows formed in the pipe retainer portion with operating end portions of the operating arms engaged with the other end of the pipe retainer portion. The retainer is provided with engagement slits at one end portion thereof. When the insert end portion of the pipe is inserted into the pipe retainer portion or into the retainer, an annular engagement projection formed on the insert end portion is engaged with the engagement slits of the retainer, so that the pipe is joined to the quick connector.

The pipe inserted into and joined to the quick connector is drawn from the quick connector when the retainer is drawn out from the pipe retainer portion after the width of a space between the operating arms is reduced by pressing the two operating end portions of the pair of operating arms of the retainer from the outside to cause the engagement claws to come out of the engagement windows.

However, when the quick connector of such a construction is joined to a pipe of a small projecting length, a distance between the connector housing of the quick connector and a base member of the pipe is small. Therefore, the operating end portions of the operating arms positioned between the connector housing and base member are difficult to be operated, so that an operation for separating the quick connector and pipe from each other becomes troublesome. In other words, operability of the operating arms of the quick connector is dependent upon the projecting length of the pipe. In the case where a sufficient space cannot be secured between the connector housing and base member of the pipe, the operation for separating the quick connector from the pipe becomes difficult.

SUMMARY OF THE INVENTION

In order to deal with this problem, it is conceived to integrally form the retainer with the pipe retainer portion so as to prevent a disengagement operating portion of the retainer from being positioned on the axially outer side of the connector housing. When the retainer is thus formed, it also becomes possible to reduce the number of parts of the quick connector. However, it is necessary that an annularly formed seal member for sealing a clearance between the insert end portion of the pipe and connector housing be fitted in the portion of the inner circumferential surface of the connector housing which is closer to the one end side in the axial direction than, for example, the pipe retainer portion. It also becomes necessary that a cylindrical or other shaped bush for axially positioning this seal member be fixedly fitted at the other end side in the axial direction of the seal member. Therefore, when the retainer is integrally formed with the pipe retainer portion, an assembling step in which the retainer is fitted in the pipe retainer portion after the annular seal member and bush are arranged in the connector housing cannot be employed. Especially, when the bush is to be placed in the connector housing, the retainer stands in the way, and the work efficiency becomes low.

An object of the present invention is to provide a quick connector having a high assembling efficiency and a high handling efficiency.

To achieve this object, the quick connector according to the present invention is a quick connector provided with a cylindrical connector housing having a tube connecting portion (widely meaning a connecting portion for an opposite member to be joined to a pipe) at one end side in an axial direction thereof and a pipe retainer portion at other end side in the axial direction thereof; and an annular seal member fitted on an inner circumferential surface of the connector housing so as to seal an outer circumferential side of an insert end portion of the pipe to be inserted into the connector housing, the pipe retainer portion being integrally provided with a retainer adapted to be snap engaged with an annular engagement projection provided on the insert end portion of the pipe, wherein the retainer has an engagement portion projecting to the interior of the pipe retainer portion or to a position ahead of a hole (for example, a hole through which the annular engagement projection is passed) of the pipe retainer portion, through which the pipe is passed, and engaged or snap engaged with the annular engagement projection, and disengagement operating portion adapted to deform and move the engagement portion radially outwardly and disengage the engagement portion and annular engagement projection from each other, the connector housing is formed by engaging with each other the other end side of a tube side member having the tube connecting portion and the one end side of a pipe side member having the pipe retainer portion, and the annular seal member is axially positioned and held in an annular recess formed in an inner circumferential surface of the connector housing when the tube side member and pipe side member are engaged with each other. In order that the quick connector and pipe can be separated from each other simply even when the quick connector is joined to a short pipe, the retainer is provided so that the disengagement operating portion or/and engagement portion are not positioned in or do not project to a position on the axially outer side of the connector housing (pipe retainer portion) or closer to the other end side than the connector housing (pipe retainer portion). In other case, the retainer is formed so that the retainer do not have parts positioned in or projecting to a position on the axially outer side of the connector housing (pipe retainer portion) or closer to the other end side than the connector housing (pipe retainer portion). The annular recess is formed of, for example, annular stepped portions formed at both axial sides thereof, and an annular bottom surface formed between the two annular stepped portions. The tube side member is formed of the tube connecting portion alone in some cases, and the pipe side member is formed of the pipe retainer portion alone in some cases.

The annular seal member for sealing a clearance between the connector housing and pipe is placed in the other end side of the tube side member or in the one end side of the pipe side member before the tube side member and the pipe side member are engaged with each other. Since the other end side of the tube side member and the one end side of the pipe side member form the annular recess when these axial sides of the two members are engaged with each other, the annular seal member is necessarily held in the annular recess. For example, the annular seal member is placed in an annular recess forming portion at the other end side of the tube side member or in an annular recess forming portion at the one end side of the pipe side member. The annular recess forming portion of the tube side member and the annular recess forming portion of the pipe side member are then engaged with each other to form the annular recess, in which the annular seal member is held.

A structure for engaging the tube side member and the pipe side member with each other which can be used in the present invention is made to a structure in which one of the other end side of the tube side member and the one end side of the pipe side member is formed to have a double structure including an inner cylindrical portion and an outer cylindrical portion with the other of the other end side of the tube side member and the one end side of the pipe side member fitted between the inner cylindrical portion and outer cylindrical portion. Although such a fitting structure is a simple structure, the firm engagement of the tube side member and the pipe side member with each other can be secured.

When the quick connector is formed so that the engagement portion is deformed and moved radially outwardly when a distance between disengagement operating portions of, for example, two retainers formed in diametrically symmetric positions is reduced by holding the disengagement operating portions of the respective retainers by fingers, especially, by the thumb and forefinger, a retainer disengagement operation can be carried out, for example, by one hand, i.e., simply. Namely, in a structure in which the retainers and the pipe are disengaged from each other by, for example, turning the disengagement operating portions by one hand while supporting the connector housing by the other, the operating of the quick connector becomes difficult in a case where the quick connector is provided in a position into which both hands of an operator are hard to be inserted.

When the pipe retainer portion is formed to have substantially a square shape in an axial view or side view thereof, it is possible to pick up the pipe retainer portion between the fingers easily and firmly, and align the quick connector with the pipe simply in the circumferential direction and thereby join the quick connector to the pipe.

When the disengagement operating portions project radially outwardly beyond the outer circumference of the pipe retainer portion, a retainer disengagement operation is carried out easily. When the disengagement operating portions are held on the inner side of the outer circumference of the pipe retainer portion, an increase in the diameter of the quick connector can be prevented, and the preventing of the breakage of the retainers can also be done.

The "axial direction" means the directions of the axes of the connector housing, pipe or the relative members, and the "radial direction" means the direction of the radii of the connector housing, pipe or the relative members, or the direction crossing the axes of the connector housing, pipe or the relative members at right angles.

The quick connector according to the present invention is easily assembled although the retainer is integrally formed.

DETAILED DESCRIPTION OF THE PREFERRED EMBODIMENT

An embodiment of the invention will now be described with reference to the drawings.

Figure 1:
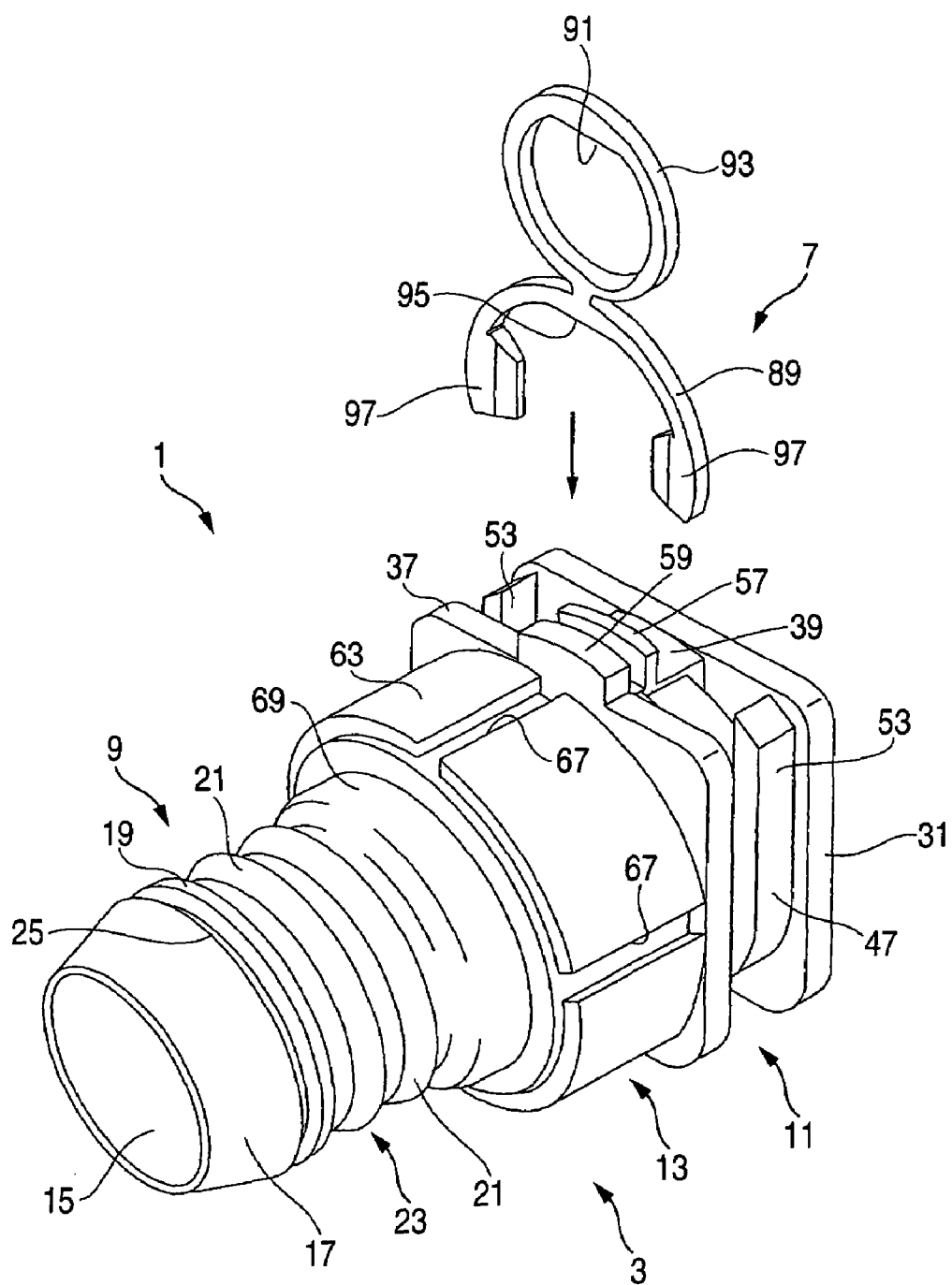
FIG. 1 is a perspective view of the quick connector according to an embodiment of the present invention.
Figure 2:
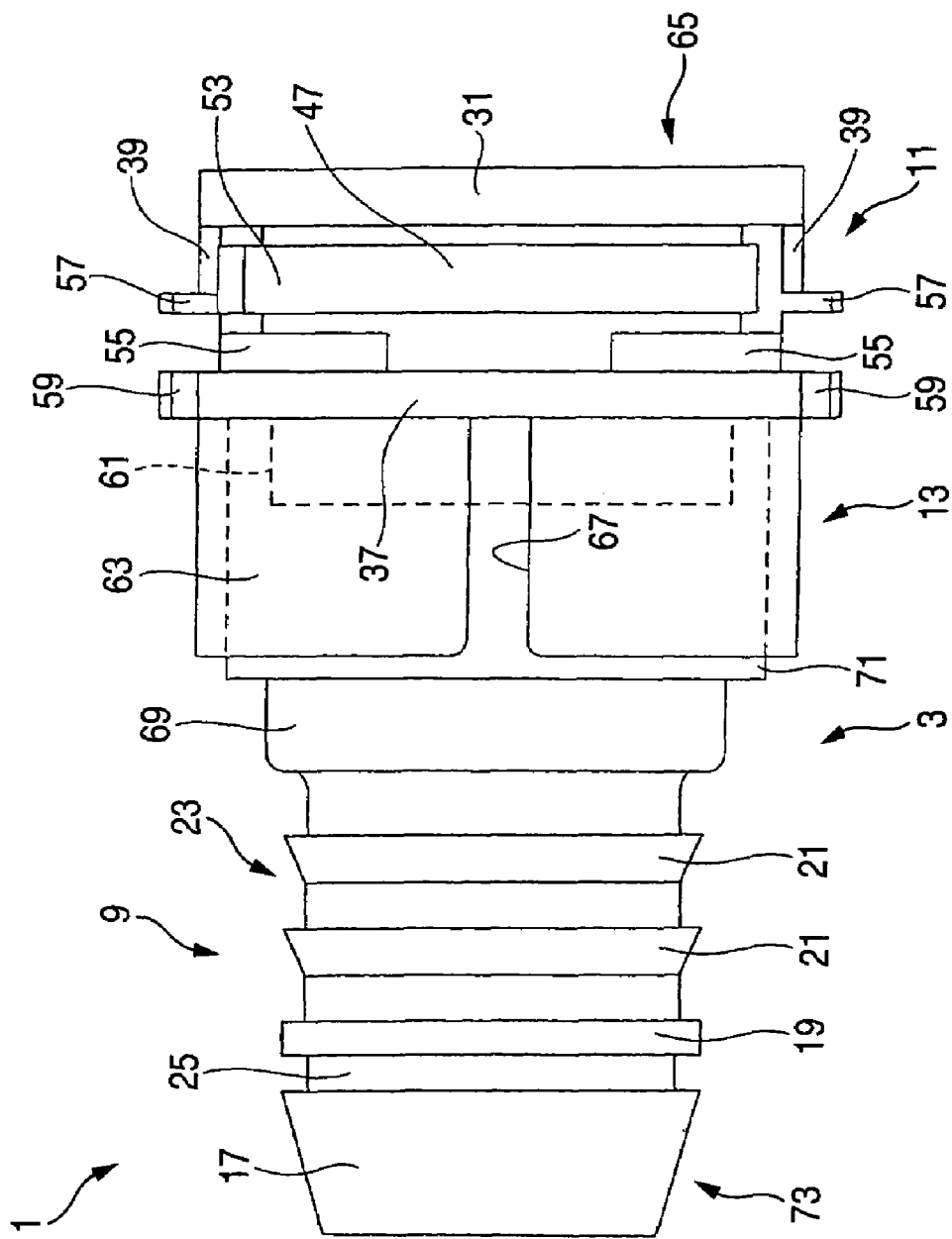
FIG. 2 is a front view of the quick connector.
Figure 3:
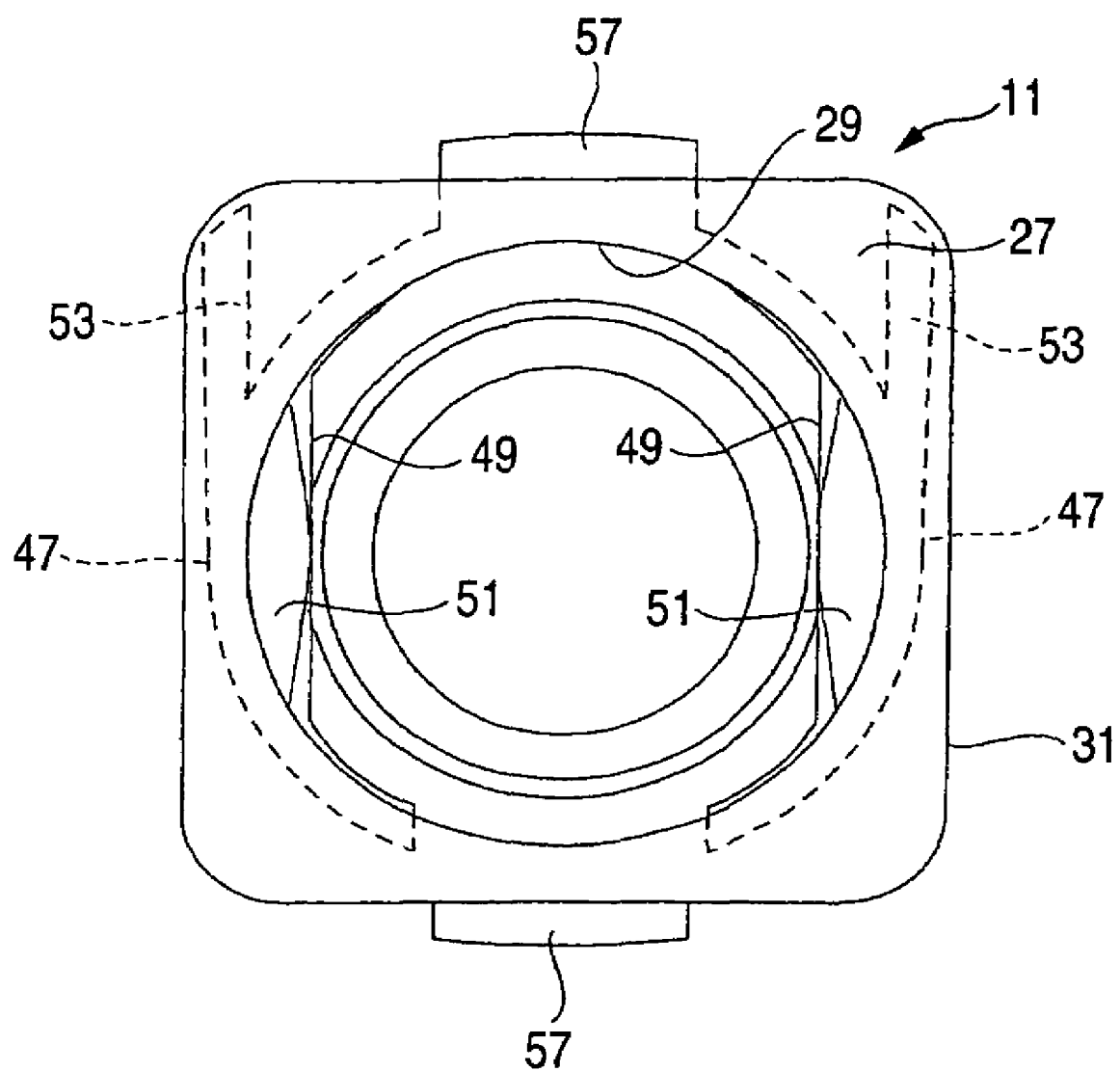
FIG. 3 is a side view or axial view of the quick connector.
Figure 4:
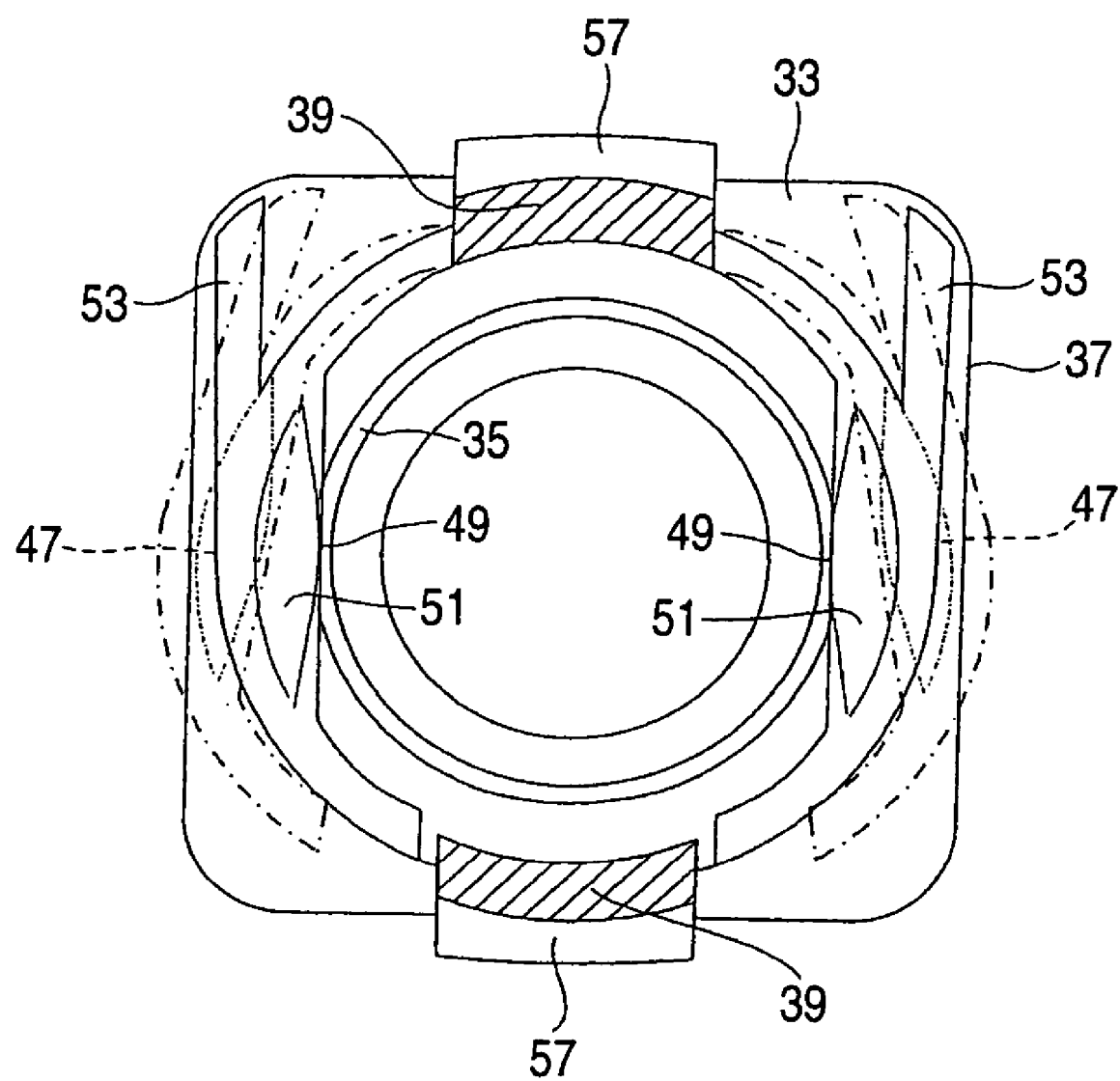
FIG. 4 is a sectional view for showing retainer arms.
Figure 5:
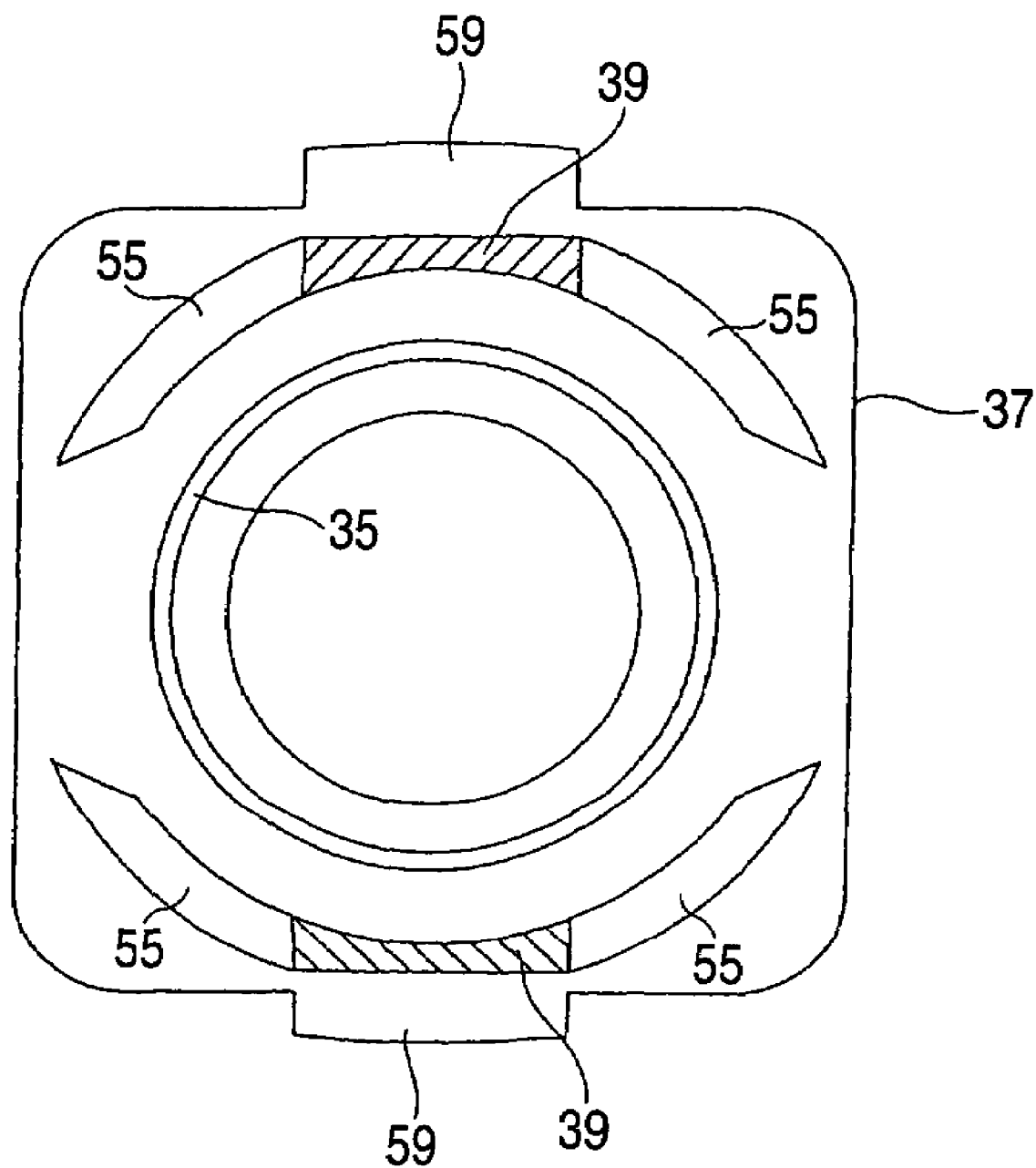
FIG. 5 is a side view or axial view of an insert side portion.
Figure 6:
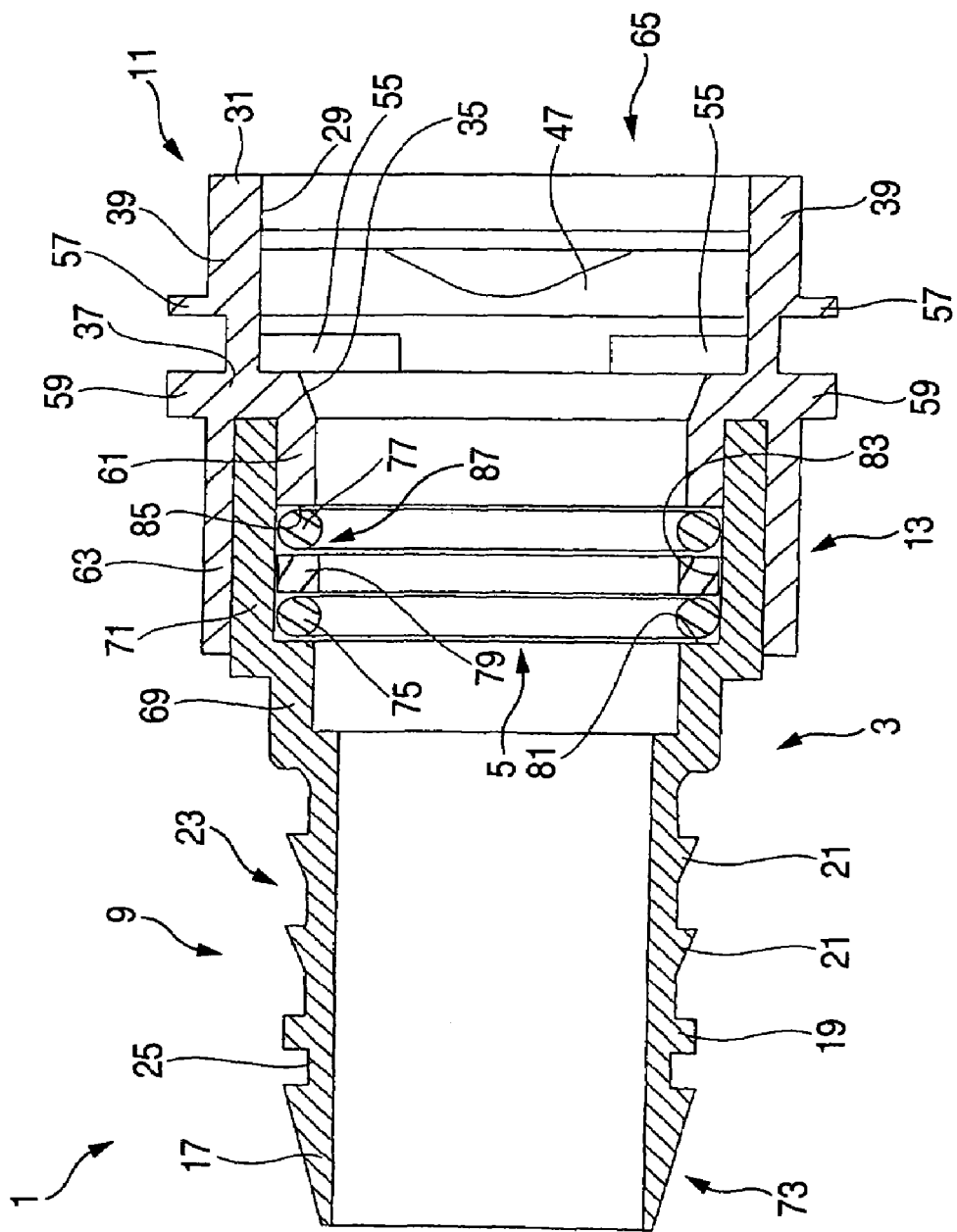
FIG. 6 is a sectional view of the quick connector.
Figure 7:
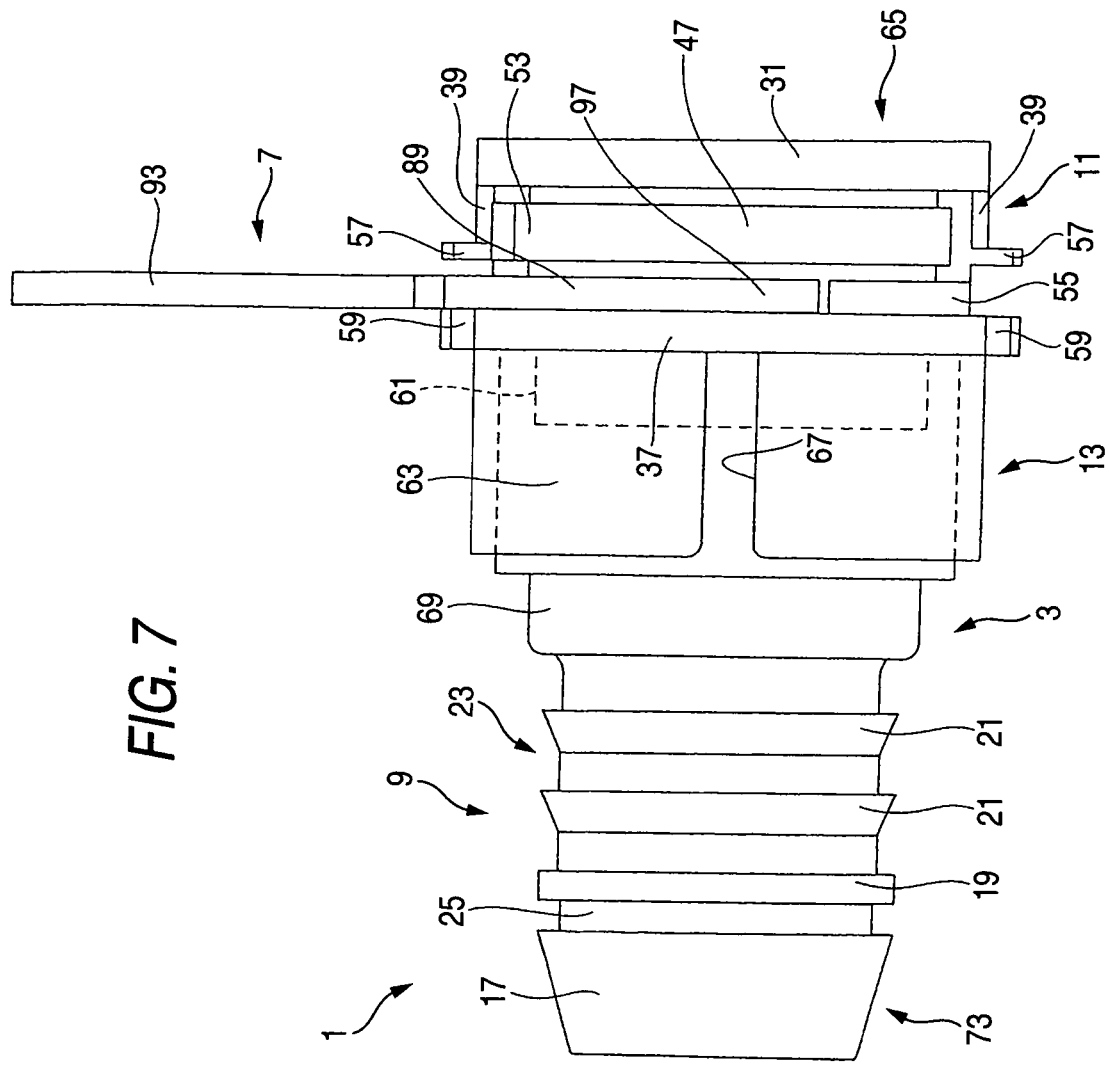
FIG. 7 is a front view showing a condition of the quick connector with a checker fixed thereto.
Figure 8:
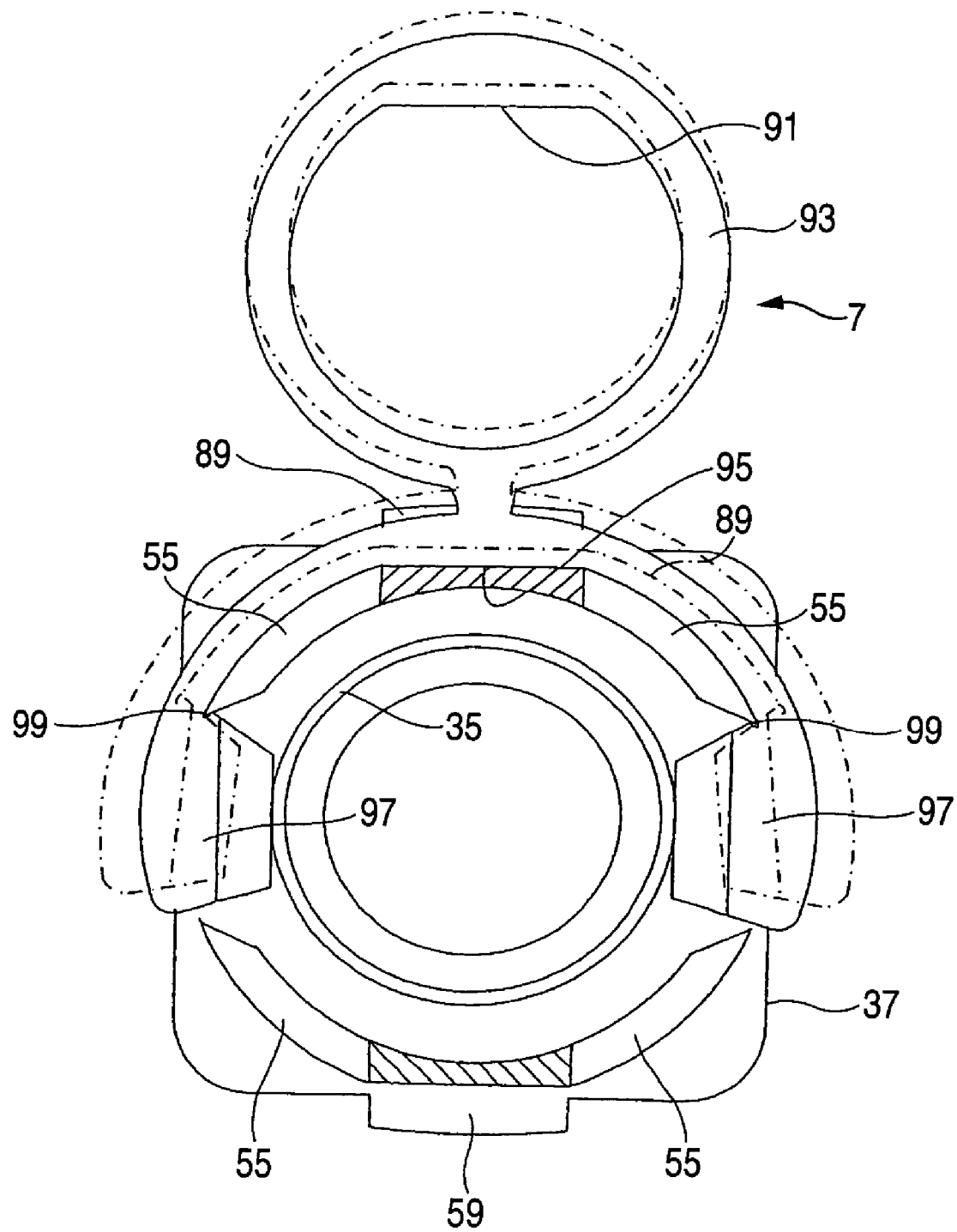
FIG. 8 is a sectional view showing the condition of the quick connector with the checker fixed thereto.

FIG. 1 is a perspective view of the quick connector according to an embodiment of the present invention, FIG. 2 is a front view of the quick connector, FIG. 3 is a side view of the quick connector, FIG. 4 is a sectional view for showing retainer arms, FIG. 5 is a side view of an insert side portion, FIG. 6 is a sectional view of the quick connector, FIG. 7 is a front view showing a condition of the quick connector with a checker fixed thereto, and FIG. 8 is a sectional view showing the condition of the quick connector with the checker fixed thereto.

A quick connector 1 is used to join together pipes in a gasoline fuel system for an automobile. The quick connector shown clearly in FIG. 1, FIG. 2 and FIG. 6 is formed with a cylindrical connector housing 3 and a seal means 5 provided therein, and used with a connection ascertainment checker 7 fixed thereto. The connector housing 3 is made of glass fiber-reinforced polyamide, and includes a cylindrical resin tube connecting portion 9 provided at one end side in an axial direction (tube connecting side) thereof, a pipe retainer portion 11 provided at the other end side in the axial direction (pipe connecting side) thereof, and a seal portion 13 provided between the resin tube connecting portion 9 and the pipe retainer portion 11, i.e., at an axially intermediate part thereof. The connector housing 3 has a through hole 15 extending from a tube connecting side end thereof to a pipe connecting side end thereof. The resin tube connecting portion 9 has a tapering tube connecting side portion 17 an outer circumferential surface of which is gradually expanding toward the pipe connecting side, and a pipe connecting side portion 23. On the pipe connecting side portion 23, an annular, cross-sectionally square slip-off preventing projection 19 and two annular, cross-sectionally right triangular slip-off preventing projections 21, 21, which expand toward the pipe connecting side, are formed in an axially spaced manner on an outer circumferential surface extending as a cylindrical outer surface at the pipe connecting side of the tube connecting side portion 17. A resin tube is fitted firmly around the outer circumference or outer circumferential surface of the resin tube connecting portion, and thereby connected thereto. A tube connecting side outer circumferential surface 25 (a portion between the tube connecting side portion 17 and annular slip-off preventing projection 19) of the pipe connecting side portion 23 is formed as an annular groove of a small diameter or a comparatively large depth, and a seal ring (not shown) is fitted on this tube connecting side outer circumferential surface 25 before the resin tube is fitted firmly around the resin tube connecting portion.

The pipe retainer portion 11 shown clearly in FIG. 3 to FIG. 5 is provided with an open side portion 31 having a square outer circumference and formed by making a pipe passing hole 29 in a square plate member so that a circumferential edge portion (outer circumferential portion) 27 (which constitutes an outer circumferential side portion of the pipe passing hole 29) of a small width remains, or by making a pipe passing hole 29 of a diameter somewhat shorter than the length of one side of the plate member; an insertion side portion 37 having a square outer circumference and formed by making a pipe insert hole 35 in a square plate member of the size as that of the open side portion 31 so that a circumferential edge portion (outer circumferential portion) 33 (which constitutes an outer circumferential side portion of the pipe insert hole 35) of a comparatively large width remains, or by making a pipe insert hole 35 of a diameter shorter than the length of one side of the plate member; and connecting portions 39, 39 for joining together in one body in diametrically symmetric positions the circumferential edge portion 27 of the open side portion 31 and that 33 of the insertion side portion 37. Thus, the pipe retainer portion is formed as a frame body capable of axially passing a pipe therethrough. The pipe passing hole 29 of the open side portion 31 is formed to have a diameter somewhat larger than the outer diameter of an annular engagement projection 45, which is formed on an insert end portion 43 of a pipe 41, in such a manner that the pipe passing hole 29 allows the passage of the annular engagement projection 45 therethrough. The pipe insert hole 35 of the insert side portion 37 is formed to have a diameter substantially equal to the outer diameter of the insert end portion 43 (the part of the pipe which corresponds to the insert end portion 43 other than the annular engagement projection 45) so that the pipe insert hole supports the insert end portion 43 of the pipe 41 without causing a backlash to occur. The pipe insert hole 35 tapers so as to expand toward the pipe connecting side thereof, and, more in detail, the tube connecting side end of the same hole is set to have a diameter substantially equal to the outer diameter of the insert end portion 43 of the pipe 41.

At the pipe connecting side of one connecting portion 39, thin, arcuately bent retainer arms 47, 47 are formed which extend from laterally both sides of the same connecting portion 39 substantially along the circumference of the pipe passing hole 29 until the retainer arms 47, 47 reach positions just before both ends of the other connecting portion 39 as shown in, especially, FIG. 2 to FIG. 4. These two retainer arms 47, 47 constitute the retainer for the quick connector 1. These retainer arms 47, 47 are provided at their circumferentially (lengthwise) inner sides or inner circumferences of intermediate portions thereof with thickening portions (engagement portions) 49, 49 which project toward the inner side of the pipe retainer portion 11 or toward the inner side of the pipe passing hole 35. The distance between the thickening portions 49, 49 is set substantially equal to the inner diameter (inner diameter of one axial end of the pipe insert hole 35 to be exact) of the pipe insert hole 35 or the outer diameter of the insert end portion 43 of the pipe 41. Therefore, the thickening portions 49, 49 allow the passage of the insert end portion 43 of the pipe 41 but, in an attempt to pass the annular engagement projection 45 through a space between the thickening portions, the thickening portions contact with the engagement projection 45. Pipe connecting side surfaces 51, 51 of the thickening portions 49, 49 are inclined radially inwardly toward the tube connecting side. Therefore, when the thickening portions 49, 49 are pressed by this annular engagement projection 45 as the annular engagement projection 45 advances, the retainer arms 47, 47 are deformed and moved (refer to a broken line in FIG. 4) radially outwardly around the parts of the upper connecting portion 39 which join the retainer arms 47, 47. Upon completion of the passage of the annular engagement projection 45 through the space between the retainer arms 47, 47, the retainer arms return in snapping actions to the radially inner side thereof, so that the thickening portions 49, 49 are snap-engaged with the annular engagement projection 45. Thus, the pipe 41 is joined to the quick connector 1 in a slip-off preventing state.

At the connecting side of the respective retainer arms 47, 47, tangentially extending disengagement members (disengagement operating portions) 53, 53 are integrally formed with the retainer arms. When the two disengagement members 53, 53 are held by the thumb and forefinger and pressed, the retainer arms 47, 47 can be deformed and moved radially outwardly (refer to the broken line in FIG. 4) around the pars thereof which are joined to the upper connecting portion 39. In the retainer arms 47, 47, the disengagement members 53, 53 are positioned close to the outer circumferences of the open side portion 31 and insert side portion 37, while the other portions are positioned on the inner side of the outer circumferences of the open side portion 31 and insert side portion 37.

As clearly shown in FIG. 5, a pipe connecting side surface of the insert side portion 37 is provided with thin fixing projections 55, 55 arcuately bent and extending a little from both sides of the respective connecting portions 39 substantially along the circumference of the pipe passing hole 29. The fixing projections 55, 55 are sharpened acutely at free end portions (free end portions on the side of outer surfaces) thereof. The projecting height of the fixing projections 55, 55 is set to be a level which permits a little axial clearance to be defined between the fixing projections 55, 55 and retainer arms 47, 47. The connecting portions 39, 39 are provided on axially central parts of the outer surfaces thereof with positioning projections 57, 57 extending over the whole widths thereof. The insert side portion 37 is provided on the outer circumference thereof with positioning projections 59, 59 so that the positioning projections 59, 59 are opposed to the positioning projections 57, 57. A distance between the positioning projection 57 and positioning projection 59 is substantially or approximately equal to the projecting height of the fixing projections 55, 55. The tube connecting sides of the respective connecting portions 39, 39 are formed flat so that the tube connecting sides join the outer surfaces of the fixing projections 55, 55.

As shown clearly in FIG. 2 and FIG. 6, the insert side portion 37 is integrally provided on a tube connecting side surface thereof with a short inner cylindrical portion 61 in such a manner that an inner circumferential surface of the inner cylindrical portion is joined to the pipe insert hole 35 or a tube connecting side end of the pipe insert hole 35. On an outer circumference of this inner cylindrical portion 61, a comparatively long outer cylindrical portion 63 is integrally provided. Thus, a pipe side member 65 provided with the pipe retainer portion 11 and a double engagement structure having a combination of the inner cylindrical portion 61 and outer cylindrical portion 63 is formed. The outer cylindrical portion 63 is provided with slits 67 in a plurality of circumferential parts thereof. The resin tube connecting portion 9 is integrally provided at the pipe connecting side end thereof with a large-diameter fitting cylindrical part 71 via a short joint part 69. Thus, a tube side member 73 including the tube connecting portion 9, joint part 69 and fitting cylindrical part 71 (fitting side) is formed. The connector housing 3 is formed by connecting the pipe side member 65 and tube side member 73 together by fitting the cylindrical part 71 of the tube side member 73 between the inner cylindrical portion 61 and outer cylindrical portion 63 of the pipe side member 65. The double engagement structure for the pipe side member 65 and fitted side of the tube side member 73 form the seal portion 13. The tube side member 73 is provided in advance on an inner circumferential surface of the fitting cylindrical part 71 thereof with a first O-ring 75 (annular seal member) and a second O-ring 77 (annular seal member) fitted therein side by side in the axial direction via a collar 79. Therefore, when the pipe side member 65 and tube side member 73 are connected together, an annular recess 87 defined by a pipe connecting side end 81 (annular stepped portion) of the joint part 69, an inner surface 83 (bottom surface) of the fitting cylindrical part 71 and a pipe connecting side end 85 (annular stepped portion) is formed on the inner circumferential surface of the seal portion 13. Moreover, the first O-ring 75 and second O-ring 77 are positioned axially and held in this annular recess 87. The fitting cylindrical part 71 of the tube side member 73 may be provided on an outer circumferential surface thereof with turning preventing projections which are to be fitted in the slits 67 of the outer cylindrical portion 63.

A checker 7 made of polyacetal (POM) is fixed to the outer circumference or outer circumferential side of the pipe retainer portion 11. This checker 7 is comparatively flexible, and formed so as to be elastically deformable. As clearly shown in FIG. 1 and FIG. 8, the checker 7 has a thin, arcuately bent checker body 89 of a diameter substantially equal to those of the outer surfaces of the fixing projections 55, 55 extending from both sides of the connecting portion 39. The checker body 89 is integrally provided on an outer side portion or a widthwise central portion of an outer circumferential portion thereof with a drawing ring 93, which is provided at one part (on the opposite side of the checker body 89) of the inner circumferential surface thereof with a flat finger-hooking portion 91. The checker body 89 is provided on a laterally central portion of the inner surface or inner circumferential surface thereof with a flat portion 95 of a length or width substantially equal to the width of the connecting portion 39. On both of the lateral ends of the checker body 89, inwardly directed engagement portions 97, 97 projecting widthwise or radially inwardly are made integral with the checker body 89. In boundary regions between the inner circumference or inner circumferential surface of the checker body 89 and inwardly directed engagement portions 97, 97, engagement portions 99, 99 with which free ends of the fixing projections 55, 55 are engaged are formed. The radially inner parts of the inwardly directed engagement portions 97, 97 are formed so that the thickness thereof becomes gradually small in the radially inward direction, and the pipe connecting side surfaces of the radially inner side portions of the inwardly directed engagement portions 97, 97 are inclined radially inwardly toward the tube connecting side thereof.

The checker 7 of such construction is fixed to the pipe retainer portion 11 with the flat portion 95 fitted in the fitting groove between the positioning projection 57 and positioning projection 59 and contacting the connecting portion 39, with the checker body 89 contacting the outer surface of the fixing projections (or embracing the outer surfaces of the fixing projections 55), and with the inwardly directed engagement portions 97, 97 projecting into the pipe retainer 11. Even when an attempt to pull the drawing ring 93 in the draw-out direction (perpendicularly outward direction from the connecting portion 39) is now made, the checker 7 is not drawn out since the engagement portions 99, 99 of the checker body 89 and free ends of the fixing projections are engaged with each other or engaged with each other in the checker drawing direction. The pipe connecting side surfaces of the radially inner parts of the inwardly directed engagement portions 97, 97 are inclined radially inwardly toward the tube connecting side thereof. Therefore, when the radially inner side portions of the inwardly directed engagement portions 97, 97 are pressed by the annular engagement projection 45 of the pipe 41, which is inserted into the interior of the pipe retainer portion 11, in accordance with the advancement of the annular engagement projection 45, the inwardly directed engagement portions 97, 97 are deformed and moved radially outwardly. As a result, the free ends of the fixing projections 55, 55 and engagement portions 99, 99 are released from the engagement force applied thereto (refer to the broken line in FIG. 8). The checker 7 is formed so that the checker can be fixed to the retainer portion 11 from the side of both the upper connecting portion 39 and the lower connecting portion 39 in the same mode.

Figure 9:
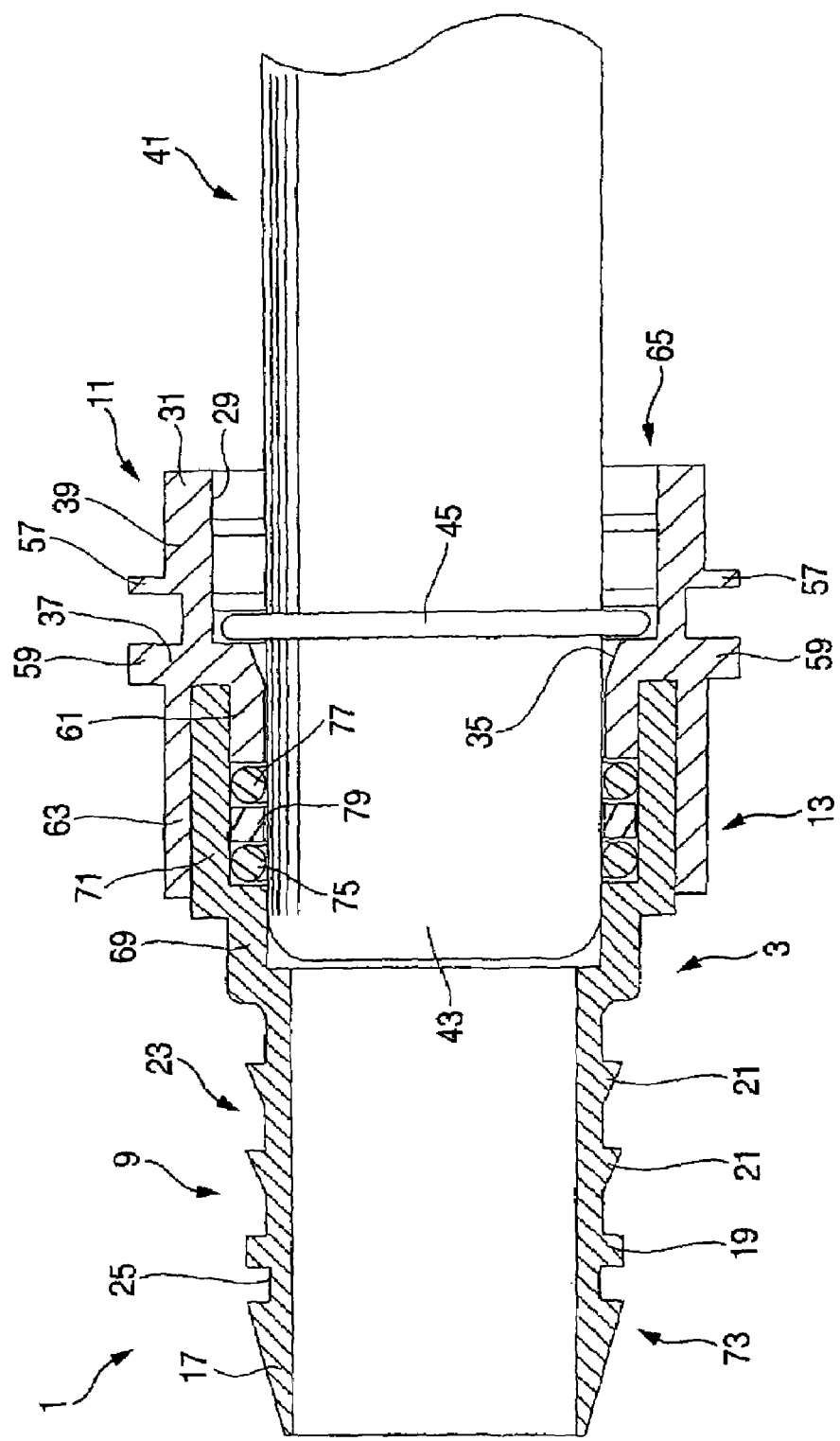
FIG. 9 is a sectional view showing a condition of the quick connector with a pipe inserted thereinto and joined thereto.
Figure 10:
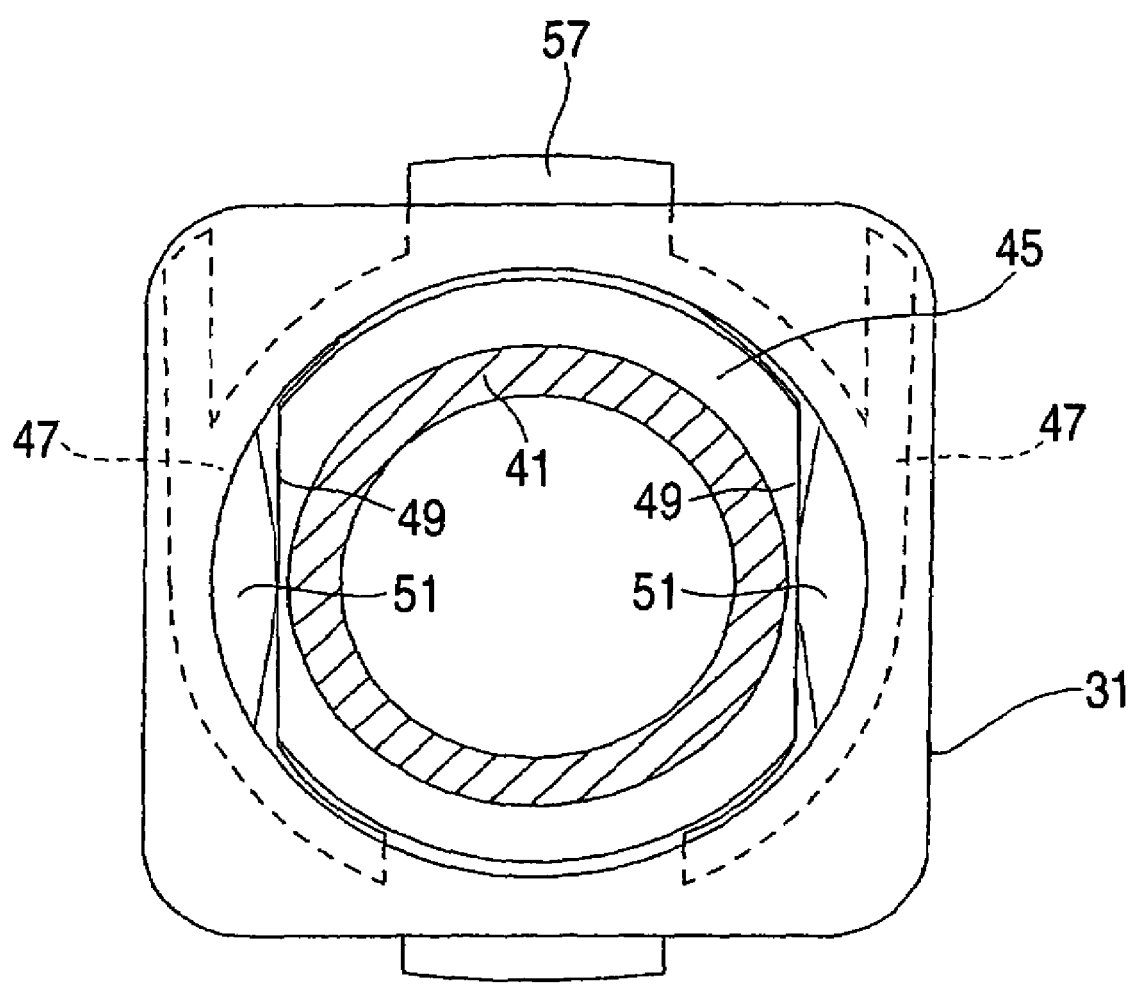
FIG. 10 is a side view showing the condition of the quick connector with the pipe inserted thereinto and joined thereto.

FIG. 9 is a sectional view showing the condition of the quick connector 1 with the pipe 41 inserted thereinto and joined thereto, and FIG. 10 is a side view showing the condition of the quick connector 1 with the pipe 41 inserted thereinto and joined thereto.

The pipe 41 has the annular engagement projection 45 on an outer circumference of the insert end portion 43. In order to relatively insert and join such a pipe 41 into and to the quick connector 1, the insert end portion 43 of the pipe 41 is relatively inserted from the pipe passing hole 29 of the open side portion 31 into the pipe retainer portion 11. The tube connecting side end (front end) of the insert end portion 43 reaches the pipe insert hole 35 and the interior of the inner cylindrical portion 61, and further advances. When the insert end portion 43 advances, the annular engagement projection of the pipe 41 is brought into contact with the thickening portions 49, and snap-engages with the retainer arms 47. The annular engagement projection 45 of the pipe 41 is held between the retainer arms 47 and insert side portion 37, and positioned axially with respect to the quick connector 1. When the annular engagement projection 45 is held between the retainer arms 47 and insert side portion 37, the inwardly directed engagement portions 97, 97 of the checker 7 are pushed back in the radially outward direction to disengage the engagement portions 99, 99 and free ends of the fixing projections 55 from each other. When the drawing ring 93 is then pulled in the draw-out direction, the checker 7 can be removed from the quick connector 1. Therefore, it can be ascertained by removing the checker 7 that the annular engagement projection 45 is snap-engaged with the retainer arms 47, and that the pipe 41 is properly joined to the quick connector. The pipe 41 is inserted into and joined to the quick connector 1 with a front end of the former passing through the first O-ring 75 and second O-ring 77 and reaching the interior of the joint portion 69. The inner diameter of the joint portion 69 is set substantially equal to the outer diameter of the insert end portion 43 of the pipe 41.

In order to relatively draw out the pipe 41 from the quick connector 1, the fingers are placed between the open side portion 31 and insert side portion 37, and the disengagement members 53, 53 of the retainer arms 47, 47 are operated by the fingers. The retainer arms 47, 47 are thereby deformed and moved radially outwardly, so that the annular engagement projection 45 of the pipe 41 and thickening portions 49, 49 of the retainer arms 47, 47 are disengaged (refer to the broken line in FIG. 4) from each other.

The quick connector according to the present invention can be assembled simply. Moreover, the quick connector is used in an engine room of an automobile in which parts are closely arranged, and demonstrates a high handling efficiency.

What is claimed is:

1. A quick connector comprising:
    a cylindrical connector housing having a tube connecting portion at one axial end and a pipe retainer portion at the other axial end, the pipe retainer portion having a retainer adapted to be snap engaged with an annular engagement projection provided on an insert end portion of a pipe to be inserted into the connector housing; and
    an annular seal member axially fined and held in an annular recess formed in an inner circumferential surface of the connector housing when the tube connecting portion and the pipe retainer portion are engaged, so as to seal an outer circumferential side of the insert end portion of the pipe;
    wherein the retainer is integrally formed with the pipe retainer portion and has an engagement portion projecting toward the interior of the pipe retainer portion which is adapted to engage the annular engagement projection, and a disengagement operating portion extending tangentially relative to the circumference of the cylindrical connector housing in a plane perpendicular to the axis of the connector housing and adapted to deform so as to move the engagement portion radially outwardly and disengage the engagement portion and annular engagement projection from each other;
    wherein the retainer comprises a pair of retainers arranged at diametrically symmetric positions in the pipe retainer portion, each retainer having the engagement portion and the disengagement operating portion, and each engagement portion is moved radially outwardly when a distance between the disengagement operating portions of the pair of retainers is reduced in a plane perpendicular to the axis of the connector housing.

2. A quick connector comprising:
    a cylindrical connector housing having a tube connecting portion at one axial end and a pipe retainer portion at the other axial end, the pipe retainer portion having a retainer adapted to be snap engaged with an annular engagement projection provided on an insert end portion of a pipe to be inserted into the connector housing; and
    an annular seal member axially fined and held in an annular recess formed in an inner circumferential surface of the connector housing when the tube connecting portion and the pipe retainer portion are engaged, so as to seal an outer circumferential side of the insert end portion of the pipe;
    wherein the retainer is integrally formed with the pipe retainer portion and has an engagement portion projecting toward the interior of the pipe retainer portion which is adapted to engage the annular engagement projection, and a disengagement operating portion extending tangentially relative to the circumference of the cylindrical connector housing in a plane perpendicular to the axis of the connector housing and adapted to deform so as to move the engagement portion radially outwardly and disengage the engagement portion and annular engagement projection from each other;
    wherein the disengagement operating portion is positioned within an outer perimeter of the pipe retainer portion.

3. The quick connector according to claims 1 or 2, wherein one of the tube connecting portion and the pipe retaining portion on the ends that engage one another has a double cylindrical structure having an inner cylindrical portion and an outer cylindrical portion which are both concentric with the cylindrical connector housing, and the other of the tube connecting portion and the pipe retaining portion on the ends that engage one another is fitted between the inner cylindrical portion and the outer cylindrical portion.

4. The quick connector according to claims 1 or 2, wherein the pipe retainer portion has substantially a square shape in an axial view thereof.

5. The quick connector according to claim 1 wherein the disengagement operating portion projects outwardly from an outer circumference of the pipe retainer portion.

* * * * *